(12) United States Patent
Hsu et al.

(10) Patent No.: US 8,428,249 B2
(45) Date of Patent: Apr. 23, 2013

(54) AUTOMATIC SLIDE COVER OPENING/CLOSING DEVICE

(75) Inventors: An Szu Hsu, New Taipei (TW); Chien Nan Tsai, New Taipei (TW)

(73) Assignee: First Dome Corporation, New Taipei (TW)

( * ) Notice: Subject to any disclaimer, the term of this patent is extended or adjusted under 35 U.S.C. 154(b) by 136 days.

(21) Appl. No.: 13/174,906

(22) Filed: Jul. 1, 2011

(65) Prior Publication Data
US 2013/0000204 A1   Jan. 3, 2013

(51) Int. Cl.
*H04M 1/00* (2006.01)
*H04M 9/00* (2006.01)

(52) U.S. Cl.
USPC .................................. 379/433.12; 455/575.4

(58) Field of Classification Search ............. 379/433.11, 379/433.12; 455/550.1, 575.1, 575.4; 361/679.39, 361/724, 725, 727
See application file for complete search history.

(56) References Cited

U.S. PATENT DOCUMENTS

| 2008/0261659 A1* | 10/2008 | Jang et al. | 455/566 |
| 2009/0168339 A1* | 7/2009 | Lee | 361/679.56 |
| 2009/0312076 A1* | 12/2009 | Lim | 455/575.4 |

* cited by examiner

*Primary Examiner* — Tuan D Nguyen
(74) *Attorney, Agent, or Firm* — Rosenberg, Klein & Lee

(57) ABSTRACT

An automatic slide cover opening/closing device includes a slide member formed with a guide slot, a base seat slidably connected with the slide member and a power member connected with a conductive contact. An engagement section is disposed on one side of the guide slot. The base seat is formed with a guide hollow intersecting the guide slot. An electrical conductor is disposed on one side of the guide hollow and connected to an external power supply. The power member serves to rotate an engagement member positioned at an intersection of the guide hollow and the guide slot. At least one elastic member is disposed on one side of the power member for elastically keeping the engagement member in abutment with the engagement section. The conductive contact can contact the electrical conductor during a stage of sliding travel of the slide member to power on the power member.

34 Claims, 9 Drawing Sheets

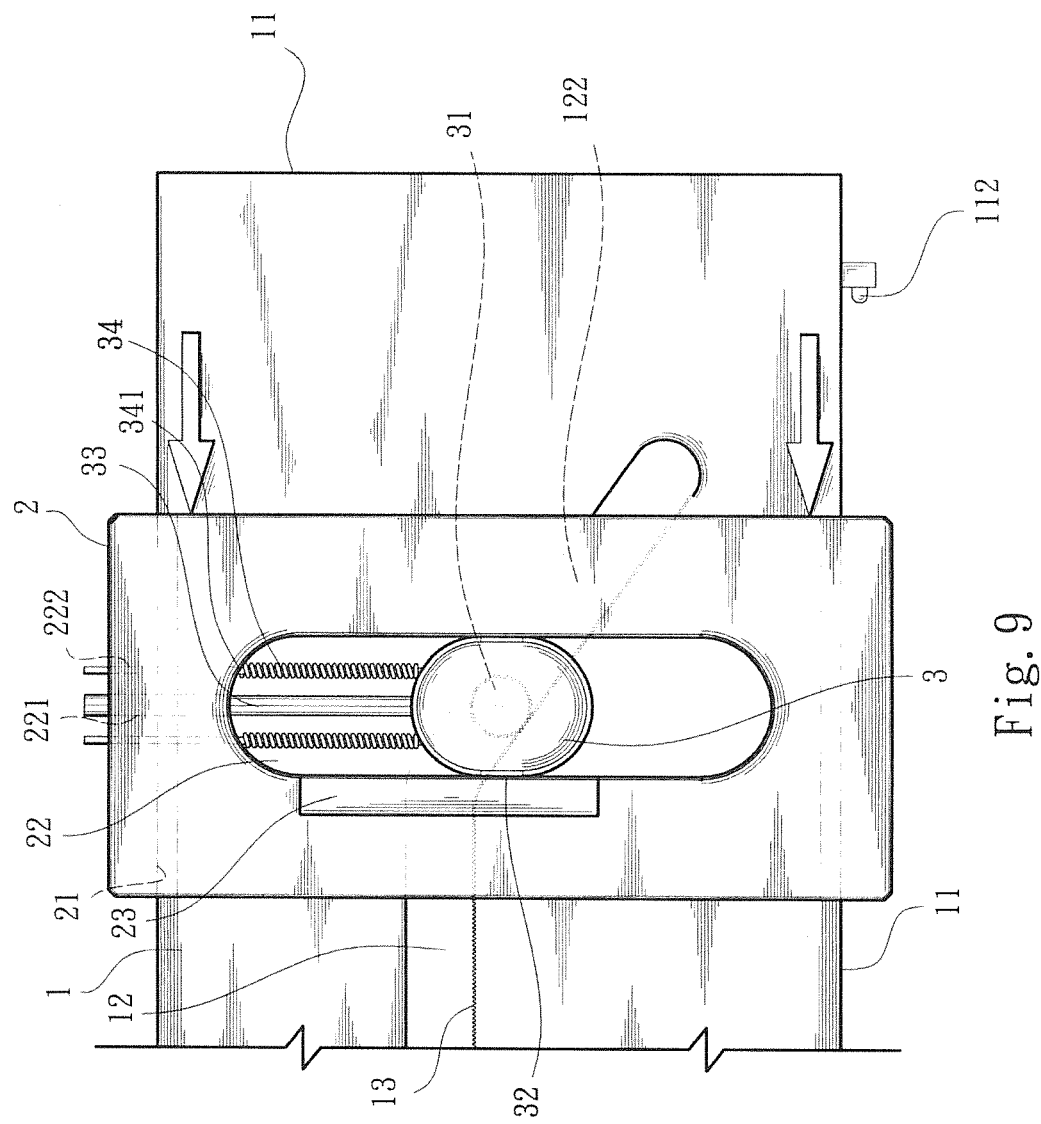

AUTOMATIC SLIDE COVER OPENING/CLOSING DEVICE

BACKGROUND OF THE INVENTION

1. Field of the Invention

The present invention relates to an automatic slide cover opening/closing device. During a stage of sliding travel of the slide cover, a power member is electrically powered on to drive the slide cover to an open position or a closed position.

2. Description of the Related Art

Various slide covers and drive structures thereof have been developed and applied to different electronic products to go with the tide of electronic product design and protect some components (such as the panels) of the electronic products. For example, Taiwanese Patent Publication No. 1328088 discloses a slide module and a portable electronic device adopting the slide module. The slide module includes a fixed system and a movable system. A fixed frame is fixedly connected to the fixed system and a movable frame is fixedly connected to the movable system. Two reverse hook sections are disposed on two sides of the fixed frame. The lateral edges of the movable frame are fitted and received in the reverse hook sections, whereby the movable system can be moved relative to the fixed system between a first position and a second position. A linear torque spring member is used to provide driving force for the movable system.

Taiwanese Patent Publication No. 1280031 discloses a slide cover device including a substrate with a guide channel and slide rail. The guide channel is formed with a curved path having an overpass point. The slide cover device further includes an upper cover formed with elongated slots and inlaid in the slide rail. The slide cover device further includes elastic members positioned at the elongated slots. The elastic members include two springs and rolling members. The fixed ends of the springs are respectively fixed at the outer ends of the elongated slots. The rolling members are respectively connected with the free ends of the springs, which free ends extend in the elongated slots. When the upper cover is moved, the rolling members move along the guide channel to drivingly compress/decompress the springs. When the rolling members pass over the overpass point, the elastic members will pull the upper cover to automatically extend or retract the upper cover relative to the substrate.

Taiwanese Patent Publication No. M392525 discloses a slide cover assembly and a slide cover electronic device. The slide cover assembly is disposed between the cover body and the main body of the electronic device. The slide cover assembly includes a support board connected with the cover body and a link board connected with the main body. A slide block is disposed in the support board. A torque spring assembly and an elastic member serve to apply a force to the slide block to slide the slide block. The slide block is connected with the link board via connection strings wound on locating poles of the support board. By means of the connection strings, the link board and the slide block always move relative to each other in reverse directions. The flat cable of the electronic device is conducted through the slide block and drivable by the slide block.

In the above structure, coil springs or linear metal torque springs are used to provide necessary driving force for the slide cover. Such structure is practically applicable to small-size electronic products with small-volume and lightweight slide cover, such as cellular phones, handheld game machines and personal digital assistants (PDA). However, such structure can be hardly applied to a large-size electronic product such as a laptop computer or a tablet computer. This is because the movable system will have a heavier weight and it is necessary to move the movable system through a longer distance. Accordingly, the elastic force of the elastic drive member must be increased and the elastic extension length of the elastic drive member must be elongated. As a result, when the slide cover slides to the end of the opening or closing travel, a greater impact is applied to the components. This is likely to cause damage of the components. Moreover, when applying a push force to one single side of the movable system, the movable system is very likely to be biased. This will affect the smoothness of the sliding movement of the movable system. In some more serious cases, the movable system may be stuck with no possibility of moving.

SUMMARY OF THE INVENTION

It is therefore a primary object of the present invention to provide an automatic slide cover opening/closing device. During a stage of sliding travel of the slide cover, a power member is electrically powered on to drive the slide cover to an open position or a closed position. The automatic slide cover opening/closing device can be conveniently used to protect the components of a large-size slide cover from impact or damage due to too great operational force.

It is a further object of the present invention to provide the above automatic slide cover opening/closing device. After the slide cover is slid through a certain distance under an external force, the power member is powered on to drive the slide cover. This can minimize the possibility of unexpected actuation due to mistouch.

To achieve the above and other objects, the automatic slide cover opening/closing device of the present invention includes: a slide member having at least one guide slot, an engagement section being disposed on at least one side of the guide slot; a base seat slidably connected with the slide member, the base seat being formed with a guide hollow intersecting the guide slot; and a power member disposed between the base seat and the slide member. The power member serves to drive and rotate an engagement member positioned at an intersection of the guide hollow and the guide slot. The engagement member is kept in abutment with the engagement section of the slide member, whereby when the power member drives the engagement member to forward or backward rotate, the base seat is urged to reciprocally slide relative to the slide member.

In the above automatic slide cover opening/closing device, at least one elastic member is disposed on one side of the power member for elastically supporting the power member.

In the above automatic slide cover opening/closing device, at least one end section of the guide slot is formed with a deflective section deflected to one side of the guide slot.

In the above automatic slide cover opening/closing device, the deflective section is selected from a group consisting of deflective section having one single turning, deflective section having a multiangular form with multiple turnings and deflective section having an arcuate form.

In the above automatic slide cover opening/closing device, an electrical conductor is disposed on at least one side of the guide hollow and connected to an external power supply. The power member is connected with a conductive contact. The conductive contact is able to contact the electrical conductor at least during a stage of sliding travel of the slide member relative to the base seat to power on the power member.

In the above automatic slide cover opening/closing device, the electrical conductor is such positioned that the length of a part of the deflective section, which part is proximal to the guide slot, projectively corresponds to the electrical conductor.

In the above automatic slide cover opening/closing device, the engagement section is a rack section having multiple teeth and the engagement member is a gear engaged with the rack section.

In the above automatic slide cover opening/closing device, the slide member is provided with two position sensing members disposed in positions in adjacent to two end sections of the guide slot.

In the above automatic slide cover opening/closing device, the elastic member is fitted around a guide bar. One end of the guide bar is connected with the power member, while the other end of the guide bar outward extends through the base seat.

In the above automatic slide cover opening/closing device, at least one elongated extension section is disposed on the power member in parallel to the guide bar. The extension section outward extends through the base seat.

In the above automatic slide cover opening/closing device, the slide member has at least one first slide guide section, while the base seat has at least one second slide guide section connected with the first slide guide section, whereby the base seat is slidable along the first slide guide sections relative to the slide member.

The present invention can be best understood through the following description and accompanying drawings, wherein:

BRIEF DESCRIPTION OF THE DRAWINGS

FIG. 9 is a plane view showing the operation of the present invention in a seventh state.

DETAILED DESCRIPTION OF THE PREFERRED EMBODIMENTS

Figure 1:
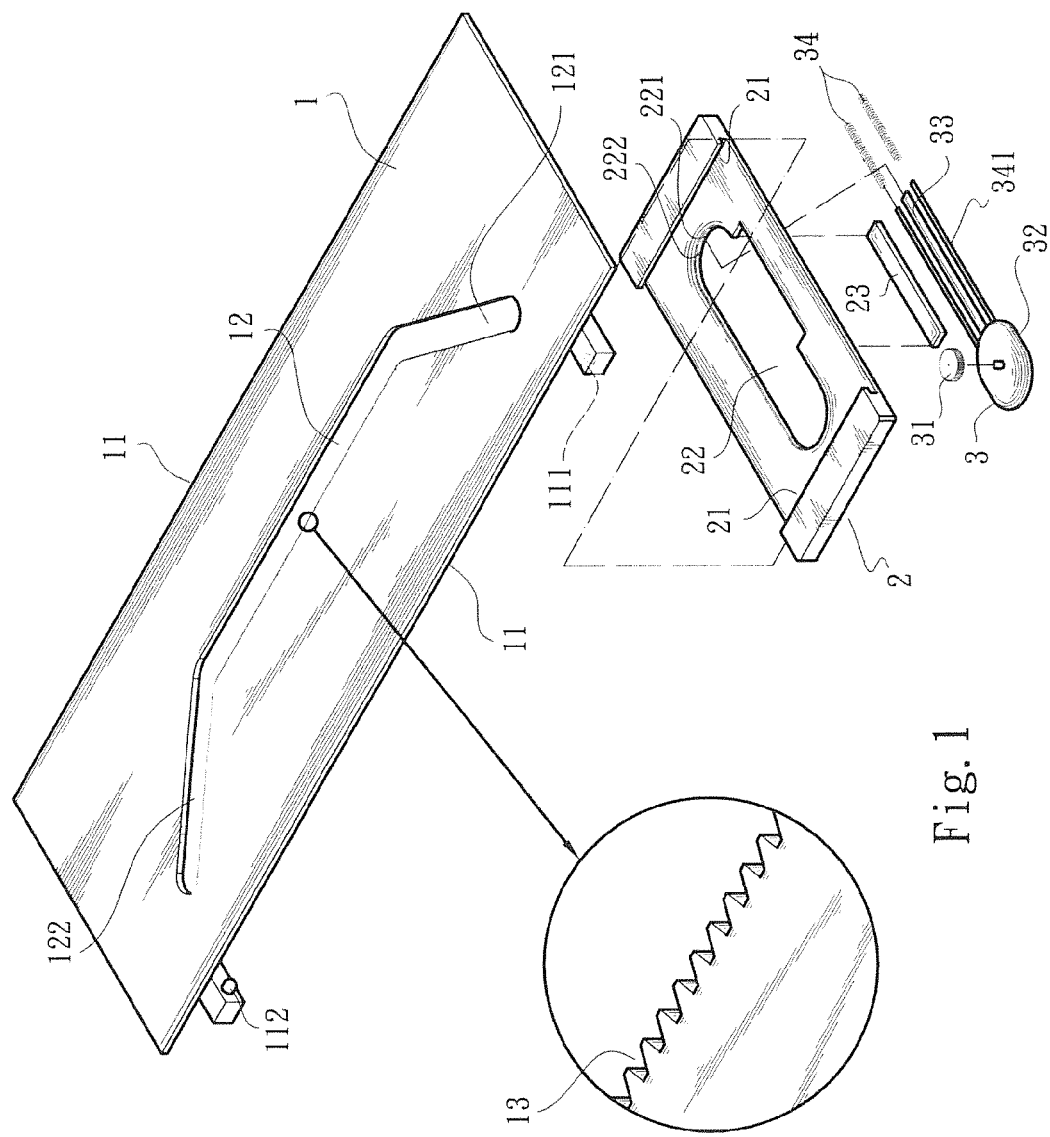
FIG. 1 is a perspective exploded view of the present invention.
Figure 2:
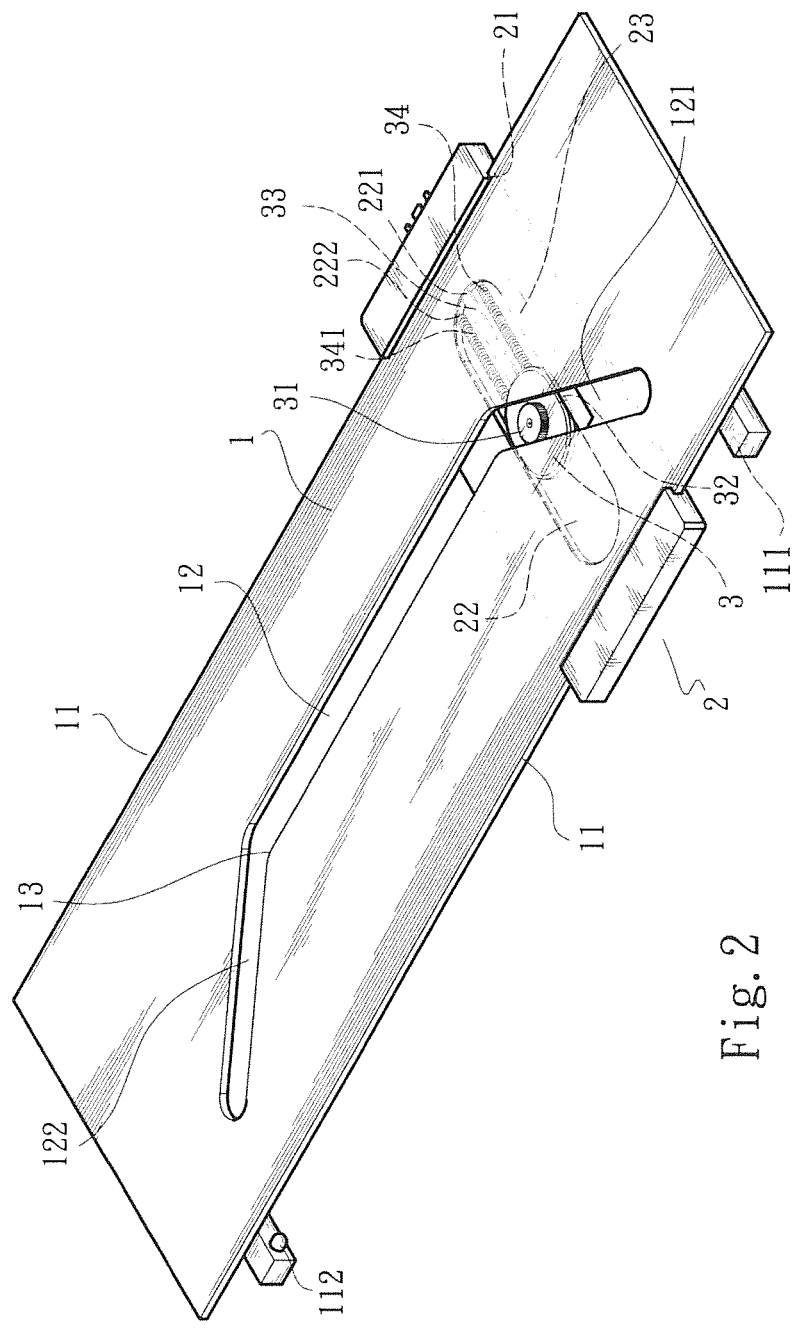
FIG. 2 is a perspective assembled view of the present invention.

Please refer to FIGS. 1 and 2. The automatic slide cover opening/closing device of the present invention includes a slide member 1, a base seat 2 and a power member 3. The slide member 1 is synchronously drivingly connectable with a slide cover (or amain body) of an electronic device. At least one first slide guide section 11, (which can be a guide rail), is disposed on the slide member 1. Preferably, multiple first slide guide sections 11 are disposed on two lateral sides of the slide member 1 in parallel to each other. In addition, at least one guide slot 12 is formed on the slide member 1 in parallel to the first slide guide sections 11. Two end sections of the guide slot 12 are respectively formed with deflective sections 121, 122 deflected to the same side. (In the drawings, the deflective sections are two laterally deflected sections, each having one single turning). In practice, the deflective sections 121, 122 alternatively can have a multiangular form with multiple turnings or have an arcuate form. In addition, an engagement section 13 is disposed on at least one side of the guide slot 12. (As shown in the drawings, the engagement section 13 is a rack section having multiple teeth). In practice, the engagement section 13 alternatively can be a straight edge. The slide member 1 is provided with two position sensing members 111, 112 disposed in positions in adjacent to the end sections of the guide slot 12. The base seat 2 is connectable with a main body (or a slide cover) of an electronic device. At least one second slide guide section 21, (which can be a fitting section for holding the guide rail), is disposed on the base seat 2 for connecting with the first slide guide section 11. Accordingly, the base seat 2 is slidable along the first slide guide sections 11 (guide slot 12). The base seat 2 is formed with a guide hollow 22 intersecting the guide slot 12. An electrical conductor 23 is disposed on at least one side of the guide hollow 22 and connected to an external power supply. The length of one side of the deflective section 121, 122, which side is proximal to the guide slot 12, projectively corresponds to the electrical conductor 23, while the length of the other side of the deflective section 121, 122, which side is distal from the guide slot 12, does not projectively correspond to the electrical conductor 23. In addition, a through hole 221 and multiple guide holes 222 are formed at one side of the guide hollow 22, which end is distal from the engagement section 13. The power member 3 is disposed between the base seat 2 and the slide member 1. After powered on, the power member 3 is able to drive and rotate an engagement member 31 positioned at an intersection of the guide hollow 22 and the guide slot 12. (In the drawings, the engagement member 31 is a gear engageable with the rack section. However, in practice, the engagement member 31 alternatively can be a roller in adaptation to the straight edge). An elongated extension section 33 and multiple parallel guide bars 341 are disposed on one side of the power member 3. The extension section 33 and the guide bars 341 respectively extend through the through hole 221 and the guide holes 222. An elastic member 34 is fitted on each guide bar 341 for elastically supporting the power member 3 and keeping the engagement member 31 (gear or roller) in abutment with the engagement section 13 (rack section or straight edge) of the slide member 1. A conductive contact 32 is connected with a surface of the power member 3. The conductive contact 32 can contact the electrical conductor 23 during a stage of the sliding travel of the slide member 1 relative to the base seat 2.

Figure 3:
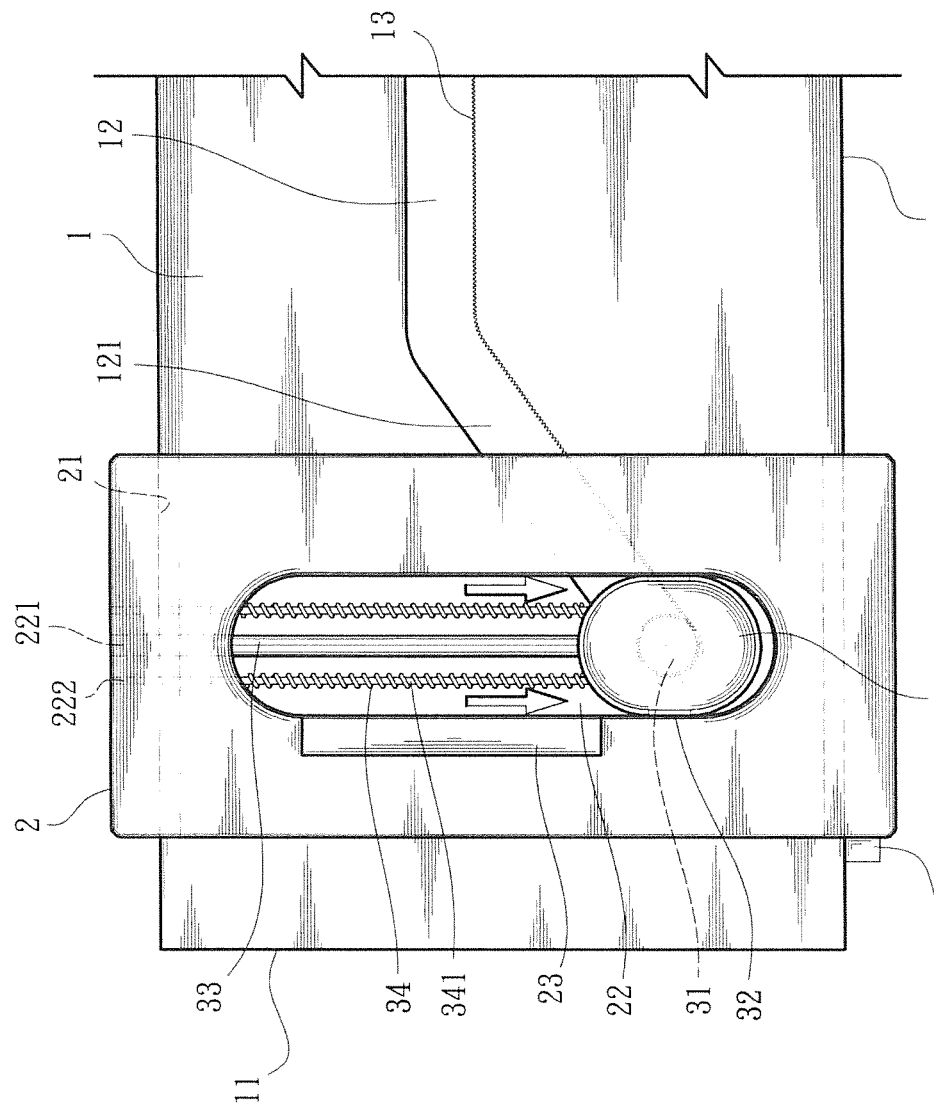
FIG. 3 is a plane view showing the operation of the present invention in a first state.
Figure 4:
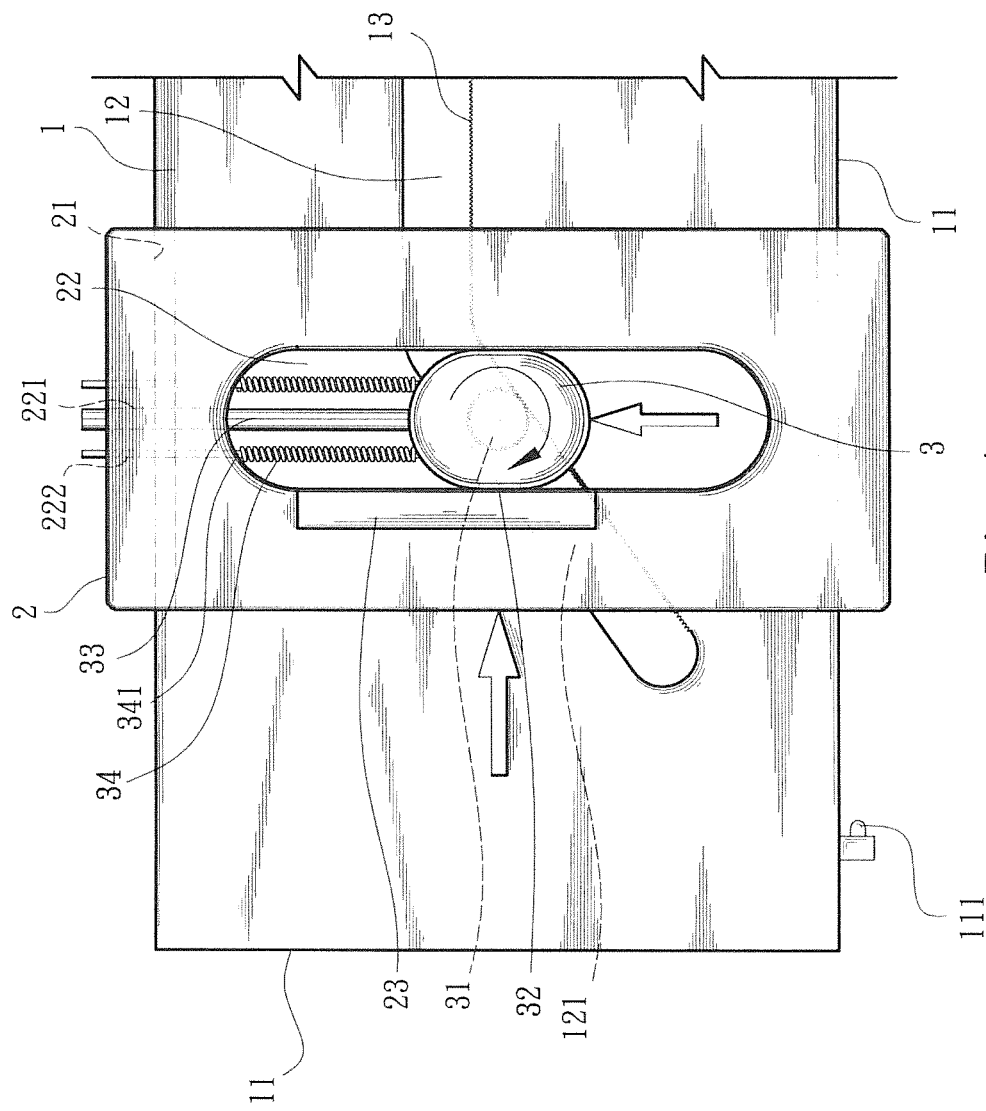
FIG. 4 is a plane view showing the operation of the present invention in a second state.
Figure 5:
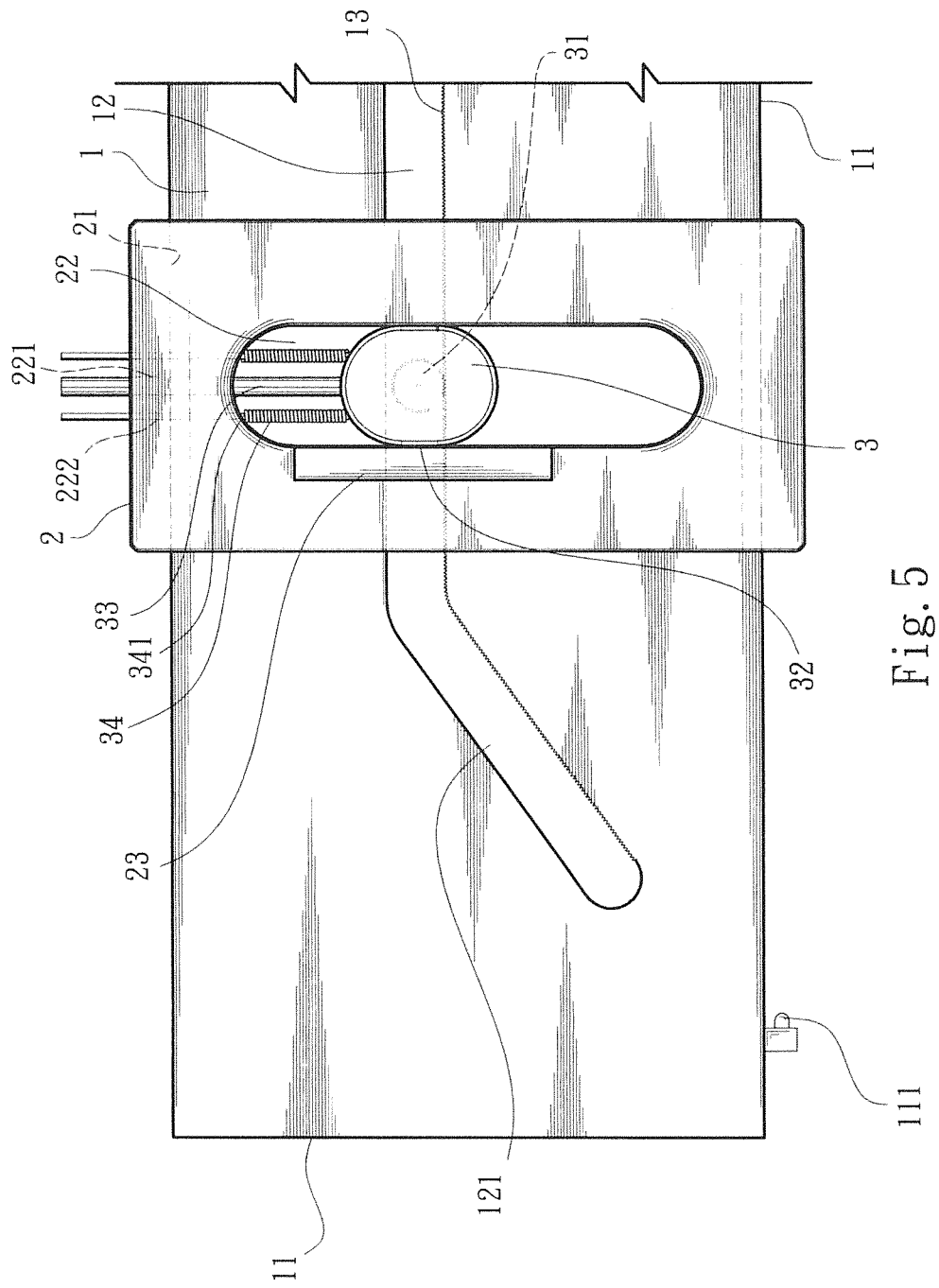
FIG. 5 is a plane view showing the operation of the present invention in a third state.
Figure 6:
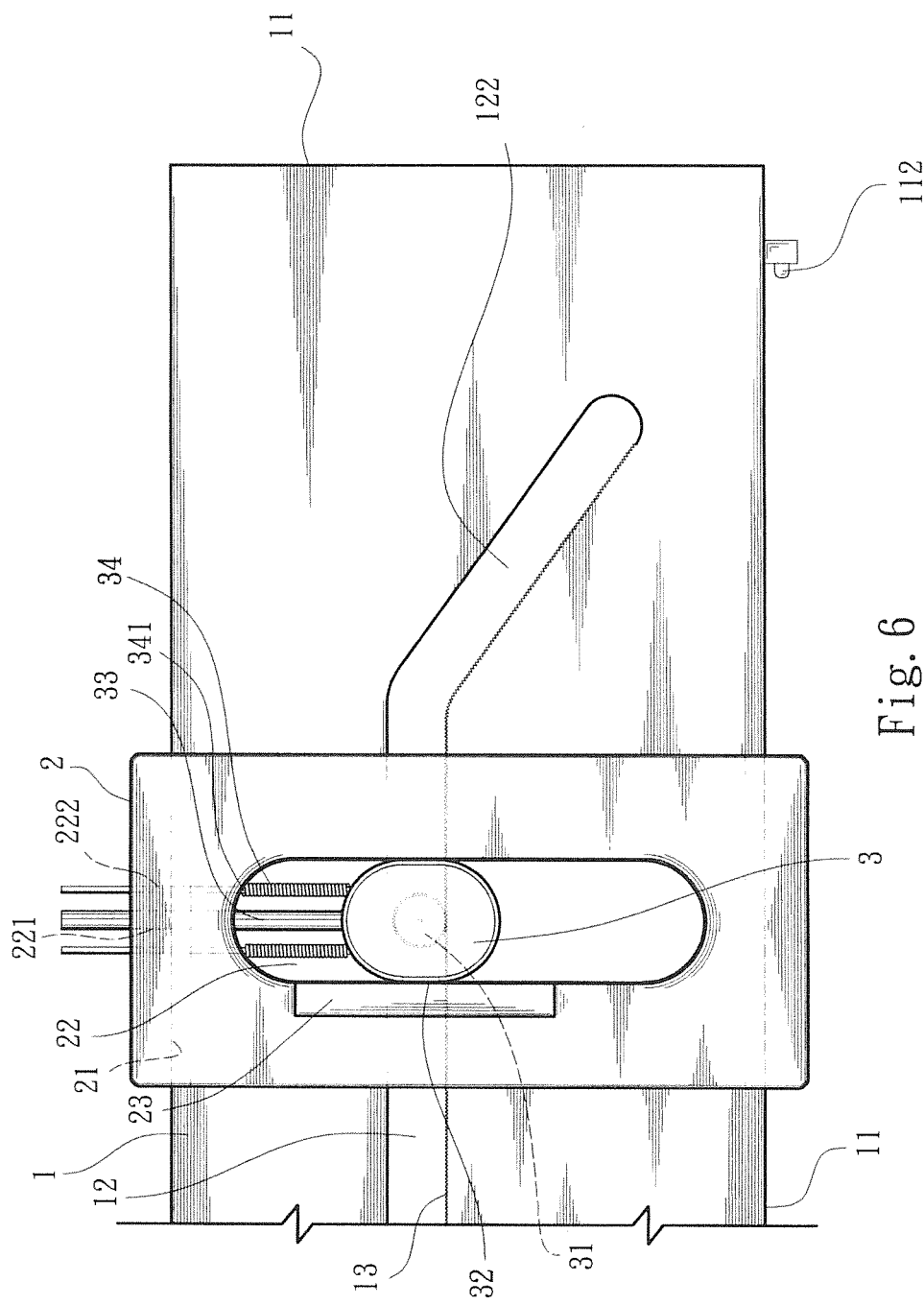
FIG. 6 is a plane view showing the operation of the present invention in a fourth state.
Figure 7:
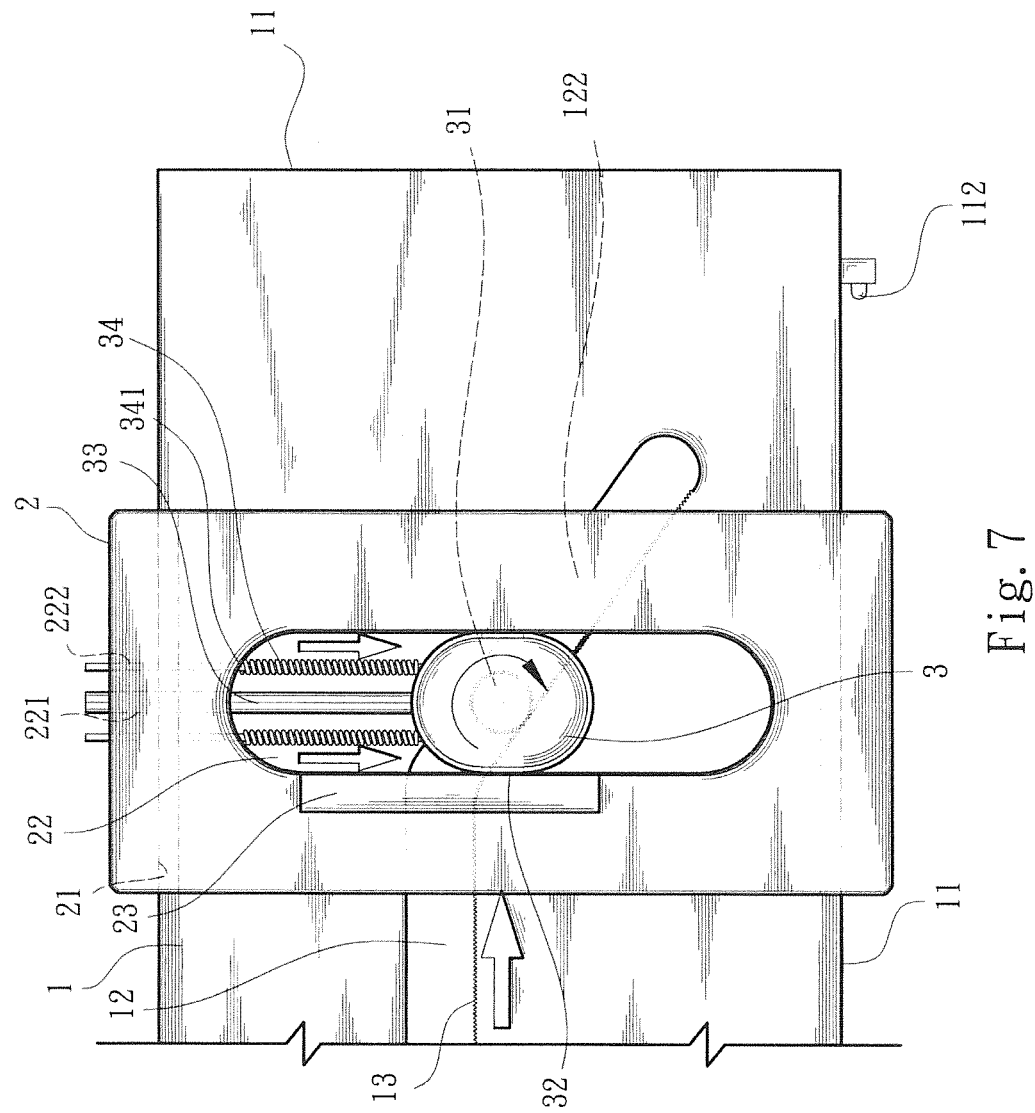
FIG. 7 is a plane view showing the operation of the present invention in a fifth state.
Figure 8:
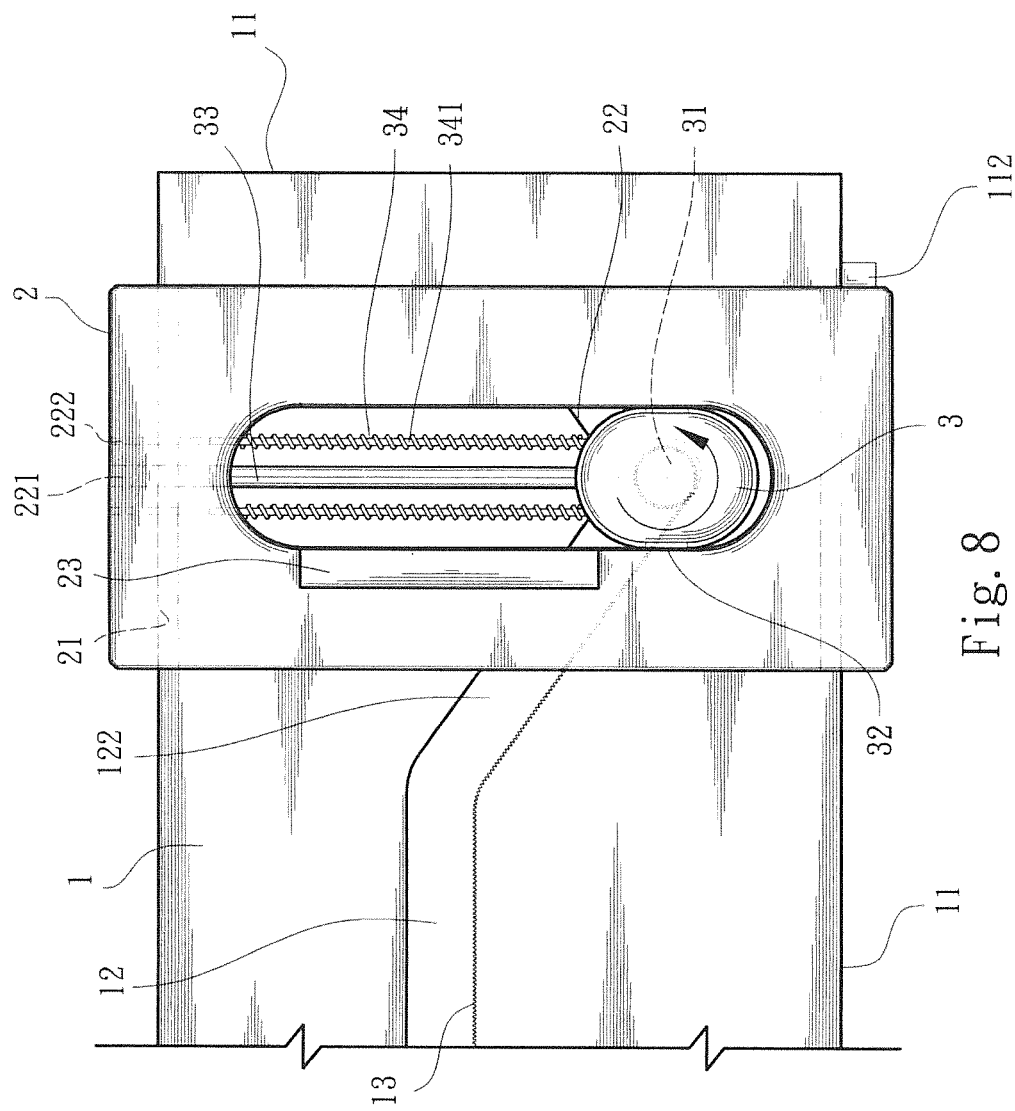
FIG. 8 is a plane view showing the operation of the present invention in a sixth state.

Please refer to FIGS. 3 to 8. In operation, when the slide cover is in a closed state, the base seat 2 is positioned at one end of the slide member 1 to touch the position sensing member 111, whereby the power member 3 goes into a forward rotation mode for driving the engagement member 31 to rotate forward (as shown in FIG. 3). At this time, the power member 3 is positioned at one end of the guide hollow 22 proximal to the engagement section 13 and the conductive contact 32 is not in contact with the electrical conductor 23. Also, the engagement member 31 is positioned at the end section of the deflective section 121 in engagement with the engagement section 13. When an operator applies a force to push and open the slide cover, the engagement member 31 starts to slide along the deflective section 121 to the middle of the guide slot 12. In the meantime, the power member 3 compresses the elastic members 34 to store energy and the engagement member 31 is passively rotated under the resistance of the engagement section 13 until the conductive contact 32 contacts the electrical conductor 23. At this time, the power member 3 is powered on to drive the engagement member 31 to actively rotate (as shown in FIG. 4). Under such circumstance, the base seat 2 can automatically slide without external force to move to the middle of the guide slot 12. At this time, the power member 3 is positioned at one end of the guide hollow 22 distal from the engagement section 13 and the elastic members 34 are compressed to a maximum extent (as shown in FIGS. 5 and 6). When the engagement member 31 moves into the deflective section 122, the elastic members 34 start to extend and release the energy. Under the elastic force of the elastic members 34, the engagement member 31 can still slide toward the end section of the deflective section 122 (as shown in FIG. 7) until the conductive contact 32 leaves the electrical conductor 23 to cut off the power for the power member 3. At this time, the engagement member 31 is stopped at the end section of the deflective section 122 and the base seat 2 slides to the other end of the slide member 1 (with the slide cover fully opened) to touch the position sensing member 112. Under such circumstance, the power member 3 goes into a backward rotation mode for driving the engagement member 31 to rotate backward (as shown in FIG. 8). When closing the slide cover from an open state, at first, the operator needs to apply a force to push and close the slide cover. At this time, the engagement member 31 slides from the end section of the deflective section 122 to the middle of the guide slot 12 and makes the conductive contact 32 into contact with the electrical conductor 23. Accordingly, the power member 3 is powered on (as shown in FIG. 9) to reverse the above opening process. In this case, at the later stage of the travel, the slide cover can be automatically closed.

The above guide slot structure 12 has two deflective sections 121, 122 at two ends, each of which has one single turning. Alternatively, the guide slot 12 can be an otherwise shaped nonlinear structure having deflective sections at two ends. For example, the deflective sections can have an arcuate form or multiangular form with multiple turnings. All these can achieve the same effect.

In conclusion, the automatic slide cover opening/closing device of the present invention can be conveniently used to minimize the possibility of unexpected actuation due to mistouch. Moreover, the components are protected from damage due to impact.

The above embodiments are only used to illustrate the present invention, not intended to limit the scope thereof. Many modifications of the above embodiments can be made without departing from the spirit of the present invention.

What is claimed is:

1. An automatic slide cover opening/closing device comprising:
   a slide member having at least one guide slot, an engagement section being disposed on at least one side of the guide slot;
   a base seat slidably connected with the slide member, the base seat being formed with a guide hollow intersecting the guide slot; and
   a power member disposed between the base seat and the slide member, the power member serving to drive and rotate an engagement member positioned at an intersection of the guide hollow and the guide slot, the engagement member being kept in abutment with the engagement section of the slide member, whereby when the power member drives the engagement member to forward or backward rotate, the base seat is urged to reciprocally slide relative to the slide member.

2. The automatic slide cover opening/closing device as claimed in claim 1, wherein at least one elastic member is disposed on one side of the power member for elastically supporting the power member.

3. The automatic slide cover opening/closing device as claimed in claim 1, wherein at least one end section of the guide slot is formed with a deflective section deflected to one side of the guide slot.

4. The automatic slide cover opening/closing device as claimed in claim 3, wherein the deflective section is selected from a group consisting of deflective section having one single turning, deflective section having a multiangular form with multiple turnings and deflective section having an arcuate form.

5. The automatic slide cover opening/closing device as claimed in claim 1, wherein an electrical conductor is disposed on at least one side of the guide hollow and connected to an external power supply, the power member being connected with a conductive contact, the conductive contact being able to contact the electrical conductor at least during a stage of sliding travel of the slide member relative to the base seat to power on the power member.

6. The automatic slide cover opening/closing device as claimed in claim 2, wherein an electrical conductor is disposed on at least one side of the guide hollow and connected to an external power supply, the power member being connected with a conductive contact, the conductive contact being able to contact the electrical conductor at least during a stage of sliding travel of the slide member relative to the base seat to power on the power member.

7. The automatic slide cover opening/closing device as claimed in claim 3, wherein an electrical conductor is disposed on at least one side of the guide hollow and connected to an external power supply, the power member being connected with a conductive contact, the conductive contact being able to contact the electrical conductor at least during a stage of sliding travel of the slide member relative to the base seat to power on the power member.

8. The automatic slide cover opening/closing device as claimed in claim 4, wherein an electrical conductor is disposed on at least one side of the guide hollow and connected to an external power supply, the power member being connected with a conductive contact, the conductive contact being able to contact the electrical conductor at least during a stage of sliding travel of the slide member relative to the base seat to power on the power member.

9. The automatic slide cover opening/closing device as claimed in claim 7, wherein the electrical conductor is such positioned that the length of a part of the deflective section, which part is proximal to the guide slot, projectively corresponds to the electrical conductor.

10. The automatic slide cover opening/closing device as claimed in claim 8, wherein the electrical conductor is such positioned that the length of a part of the deflective section, which part is proximal to the guide slot, projectively corresponds to the electrical conductor.

11. The automatic slide cover opening/closing device as claimed in claim 1, wherein the engagement section is a rack section having multiple teeth and the engagement member is a gear engaged with the rack section.

12. The automatic slide cover opening/closing device as claimed in claim 2, wherein the engagement section is a rack section having multiple teeth and the engagement member is a gear engaged with the rack section.

13. The automatic slide cover opening/closing device as claimed in claim 3, wherein the engagement section is a rack section having multiple teeth and the engagement member is a gear engaged with the rack section.

14. The automatic slide cover opening/closing device as claimed in claim 4, wherein the engagement section is a rack section having multiple teeth and the engagement member is a gear engaged with the rack section.

15. The automatic slide cover opening/closing device as claimed in claim 5, wherein the engagement section is a rack section having multiple teeth and the engagement member is a gear engaged with the rack section.

16. The automatic slide cover opening/closing device as claimed in claim 7, wherein the engagement section is a rack section having multiple teeth and the engagement member is a gear engaged with the rack section.

17. The automatic slide cover opening/closing device as claimed in claim 1, wherein the slide member is provided with two position sensing members disposed in positions in adjacent to two end sections of the guide slot for controlling the power member to rotate forward or backward.

18. The automatic slide cover opening/closing device as claimed in claim 2, wherein the slide member is provided with two position sensing members disposed in positions in adjacent to two end sections of the guide slot for controlling the power member to rotate forward or backward.

19. The automatic slide cover opening/closing device as claimed in claim 3, wherein the slide member is provided with two position sensing members disposed in positions in adjacent to two end sections of the guide slot for controlling the power member to rotate forward or backward.

20. The automatic slide cover opening/closing device as claimed in claim 4, wherein the slide member is provided with two position sensing members disposed in positions in adjacent to two end sections of the guide slot for controlling the power member to rotate forward or backward.

21. The automatic slide cover opening/closing device as claimed in claim 5, wherein the slide member is provided with two position sensing members disposed in positions in adjacent to two end sections of the guide slot for controlling the power member to rotate forward or backward.

22. The automatic slide cover opening/closing device as claimed in claim 7, wherein the slide member is provided with two position sensing members disposed in positions in adjacent to two end sections of the guide slot for controlling the power member to rotate forward or backward.

23. The automatic slide cover opening/closing device as claimed in claim 2, wherein the elastic member is fitted around a guide bar, one end of the guide bar being connected with the power member, while the other end of the guide bar outward extending through the base seat.

24. The automatic slide cover opening/closing device as claimed in claim 23, wherein at least one elongated extension section is disposed on the power member in parallel to the guide bar, the extension section outward extending through the base seat.

25. The automatic slide cover opening/closing device as claimed in claim 1, wherein the slide member has at least one first slide guide section, while the base seat has at least one second slide guide section connected with the first slide guide section, whereby the base seat is slidable along the first slide guide sections relative to the slide member.

26. The automatic slide cover opening/closing device as claimed in claim 2, wherein the slide member has at least one first slide guide section, while the base seat has at least one second slide guide section connected with the first slide guide section, whereby the base seat is slidable along the first slide guide sections relative to the slide member.

27. The automatic slide cover opening/closing device as claimed in claim 3, wherein the slide member has at least one first slide guide section, while the base seat has at least one second slide guide section connected with the first slide guide section, whereby the base seat is slidable along the first slide guide sections relative to the slide member.

28. The automatic slide cover opening/closing device as claimed in claim 4, wherein the slide member has at least one first slide guide section, while the base seat has at least one second slide guide section connected with the first slide guide section, whereby the base seat is slidable along the first slide guide sections relative to the slide member.

29. The automatic slide cover opening/closing device as claimed in claim 5, wherein the slide member has at least one first slide guide section, while the base seat has at least one second slide guide section connected with the first slide guide section, whereby the base seat is slidable along the first slide guide sections relative to the slide member.

30. The automatic slide cover opening/closing device as claimed in claim 7, wherein the slide member has at least one first slide guide section, while the base seat has at least one second slide guide section connected with the first slide guide section, whereby the base seat is slidable along the first slide guide sections relative to the slide member.

31. The automatic slide cover, opening/closing device as claimed in claim 11, wherein the slide member has at least one first slide guide section, while the base seat has at least one second slide guide section connected with the first slide guide section, whereby the base seat is slidable along the first slide guide sections relative to the slide member.

32. The automatic slide cover opening/closing device as claimed in claim 15, wherein the slide member has at least one first slide guide section, while the base seat has at least one second slide guide section connected with the first slide guide section, whereby the base seat is slidable along the first slide guide sections relative to the slide member.

33. The automatic slide cover opening/closing device as claimed in claim 17, wherein the slide member has at least one first slide guide section, while the base seat has at least one second slide guide section connected with the first slide guide section, whereby the base seat is slidable along the first slide guide sections relative to the slide member.

34. The automatic slide cover opening/closing device as claimed in claim 21, wherein the slide member has at least one first slide guide section, while the base seat has at least one second slide guide section connected with the first slide guide section, whereby the base seat is slidable along the first slide guide sections relative to the slide member.

* * * * *